(12) United States Patent
Callahan et al.

(10) Patent No.: US 7,547,350 B2
(45) Date of Patent: Jun. 16, 2009

(54) AIR INDUCTION SYSTEM WITH HYDROCARBON TRAP ASSEMBLY

(75) Inventors: Douglas J Callahan, Rochester Hills, MI (US); Mark T Van de Bogert, Walworth, WI (US)

(73) Assignee: Miniature Precision Components, Inc., Southfield, MI (US)

( * ) Notice: Subject to any disclaimer, the term of this patent is extended or adjusted under 35 U.S.C. 154(b) by 523 days.

(21) Appl. No.: 11/032,191

(22) Filed: Jan. 10, 2005

(65) Prior Publication Data

US 2006/0150811 A1    Jul. 13, 2006

(51) Int. Cl.
    *B01D 53/02*    (2006.01)
(52) U.S. Cl. .......................... 95/143; 95/148; 55/385.3; 55/505; 55/521; 96/108; 96/134; 123/198 E; 123/519
(58) Field of Classification Search ............... 55/385.3, 55/503, 505, 521, 385; 96/108, 134; 95/143, 95/146, 148; 123/198 E, 519
    See application file for complete search history.

(56) References Cited

U.S. PATENT DOCUMENTS 4,289,513 A * 9/1981 Brownhill et al. ............. 96/135

| | | | |
|---|---|---|---|
| 6,692,551 B2 | 2/2004 | Wernholm et al. | |
| 6,736,115 B1 | 5/2004 | Leffel et al. | |
| 6,736,871 B1 | 5/2004 | Green et al. | |
| 6,758,885 B2 | 7/2004 | Leffel et al. | |
| 2006/0162704 A1 * | 7/2006 | Hagler et al. ............... | 123/518 |

OTHER PUBLICATIONS

MeadWestvaco ACS-135/270 Product Data Bulletin. Copyright 2002.

* cited by examiner

*Primary Examiner*—Robert A. Hopkins
(74) *Attorney, Agent, or Firm*—Harness, Dickey & Pierce, P.L.C.

(57) ABSTRACT

A hydrocarbon trap that includes a sheet paper element and a plurality of fingers. The paper element is at least partially formed of a material capable of adsorbing and desorbing gaseous hydrocarbons. The paper element is arranged into a plurality of adjacent sheet members. The fingers are disposed between and support adjacent pairs of the sheet members so that each adjacent pair of the sheet members forms a flow channel. A method for filtering gaseous hydrocarbons from an air flow is also provided.

52 Claims, 9 Drawing Sheets

AIR INDUCTION SYSTEM WITH HYDROCARBON TRAP ASSEMBLY

INTRODUCTION

The present invention generally relates to air cleaners and more particularly to a hydrocarbon trap for reducing evaporative emissions from an internal combustion engine.

Emissions regulations on devices powered by internal combustion engines, such as vehicles, motorized lawn/garden/farming equipment and hand-held outdoor power tools, have largely focused on two distinct types of emission sources: exhaust emissions discharged from the engine and evaporative emissions released from the fuel tank. Evaporative hydrocarbon emissions emanating from the internal combustion engine itself, however, remain a significant source of pollution.

One proposed solution reducing evaporative emissions from an engine is described in U.S. Pat. No. 6,692,551. This proposed solution employs an adapter that is coupled to an air cleaner housing. The adapter includes a puck-like filter element that is positioned to intercept hydrocarbons before they migrate reversely from the engine intake manifold through the engine air intake and outward to the atmosphere. In practice, these puck-like filter elements suffer from several drawbacks, including durability, including susceptibility to damage as a result of crushing or impact (e.g., dropping); restricting air flow between the air intake filter and the engine intake manifold; cost; a relatively limited capacity to adsorb hydrocarbons; and tamper-ability (e.g., relatively easy removal of the puck-like filter element). Accordingly, there remains a need in the art for an improved hydrocarbon trap for capturing gaseous hydrocarbons emitted by an internal combustion engine.

SUMMARY

In one form, the present teachings provide a hydrocarbon trap that includes a sheet paper element and a plurality of fingers. The paper element is at least partially formed of a material capable of adsorbing and desorbing gaseous hydrocarbons. The paper element is arranged into a plurality of adjacent sheet members. The fingers are disposed between and support adjacent pairs of the sheet members so that each adjacent pair of the sheet members forms a flow channel.

In another form, the present teachings provide a hydrocarbon trap assembly with a housing and an air cleaner assembly that is coupled to the housing. The air cleaner assembly includes a support and a hydrocarbon adsorbent paper element. The support includes a plurality of comb members, each of which having a plurality of teeth. The hydrocarbon adsorbent paper element is woven through the teeth of the comb members so as to define a plurality of supported flow channels.

In yet another form, the present teachings provide a method that includes: providing a housing; installing a hydrocarbon adsorbent paper element in the housing such that the hydrocarbon adsorbent paper element at least partially defines a plurality of flow channels; and adsorbing hydrocarbons into the hydrocarbon adsorbent paper element from air passing in a first direction through the flow channels.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE VARIOUS EMBODIMENTS

Figure 1:
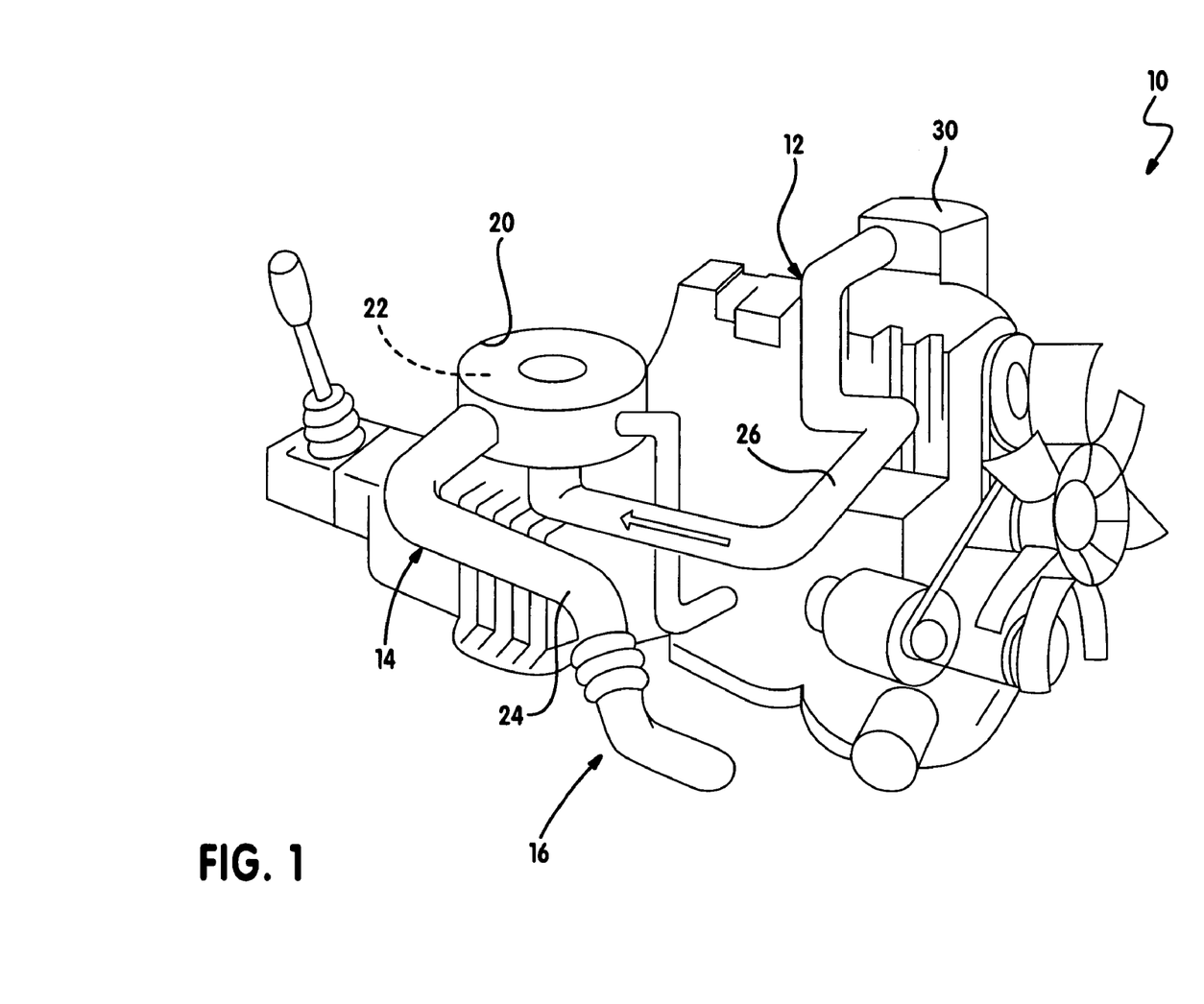
FIG. 1 is a perspective view of a powertrain with an air induction system constructed in accordance with the teachings of the present invention.

With reference to FIG. 1 of the drawings, an exemplary powertrain of a motor vehicle with an air induction system constructed in accordance with the teachings of the present invention is generally indicated at reference numeral 10. The powertrain 10 includes an engine 12 whose output is transmitted to a transmission 14. The engine 12 includes an air induction system 16 that routes air to the engine 12 for use in a combustion event.

The air induction system 16 includes an air filter housing 20, a primary air filter 22, an inlet duct 24 and a clean air duct 26. The air filter housing 20 includes an inlet which is coupled in fluid connection to the inlet duct 24 and an outlet which is coupled in fluid connection to the clean air duct 26. The primary air filter 22 is housed in the air filter housing 20 and filters dirt and debris from the air that is routed into the air filter housing 20 by the inlet duct 24. Filtered or clean air is routed to an engine intake manifold 30 via the clean air duct 26.

Figure 2:
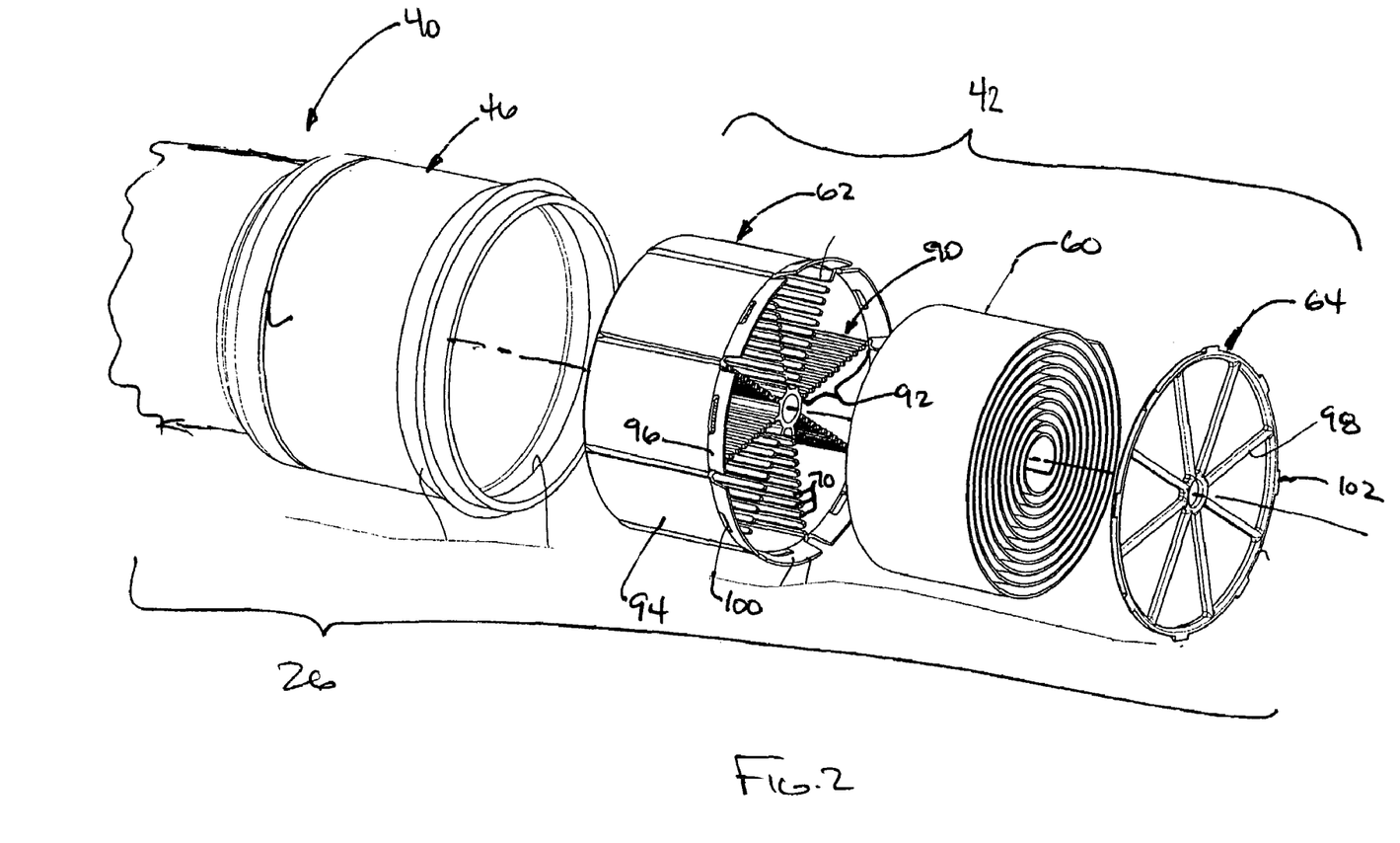
FIG. 2 is an exploded perspective view of a portion of the air induction system of FIG. 1 illustrating the clean air duct in greater detail.
Figure 3:
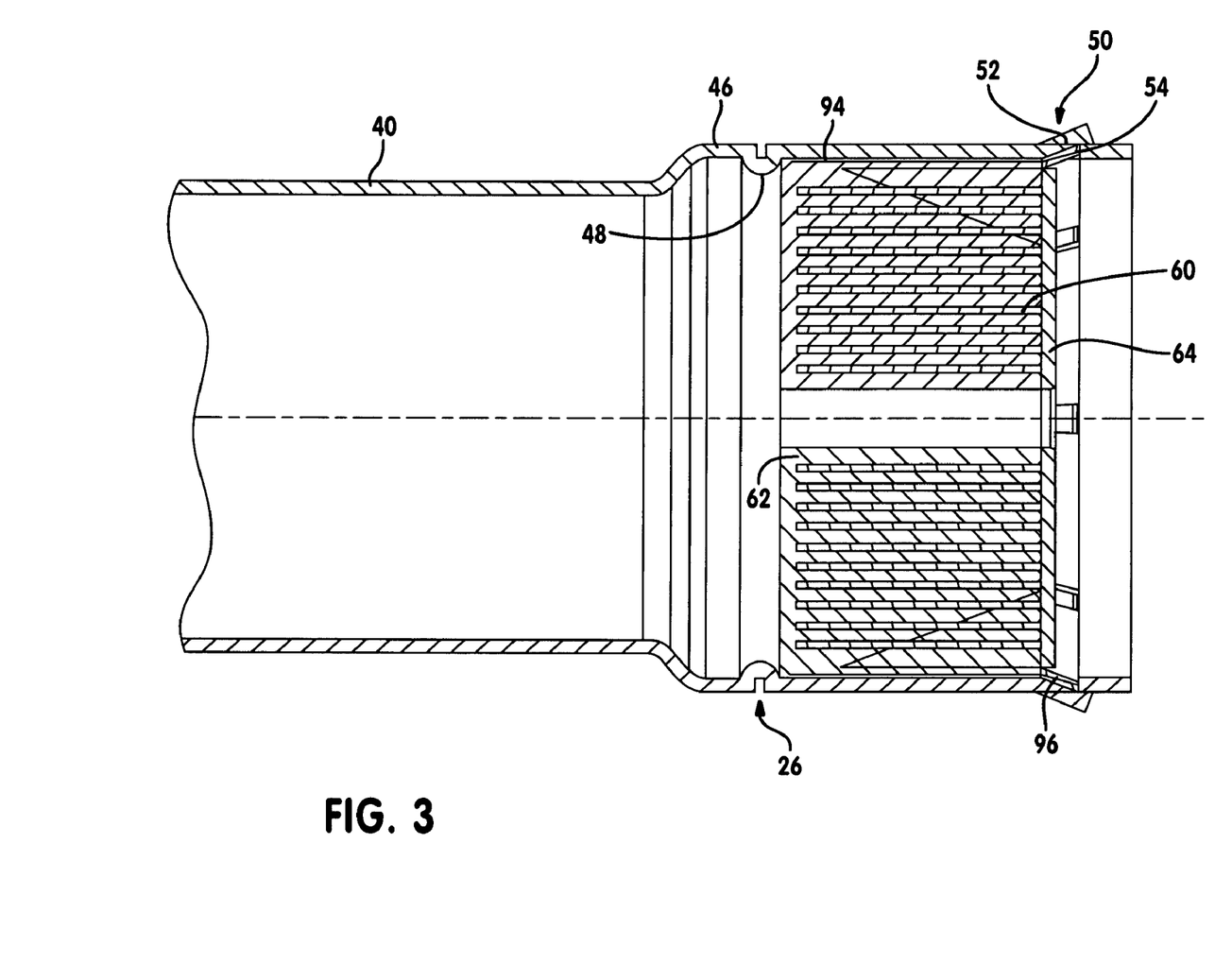
FIG. 3 is a longitudinal section view of a portion of the clean air duct.
Figure 4:
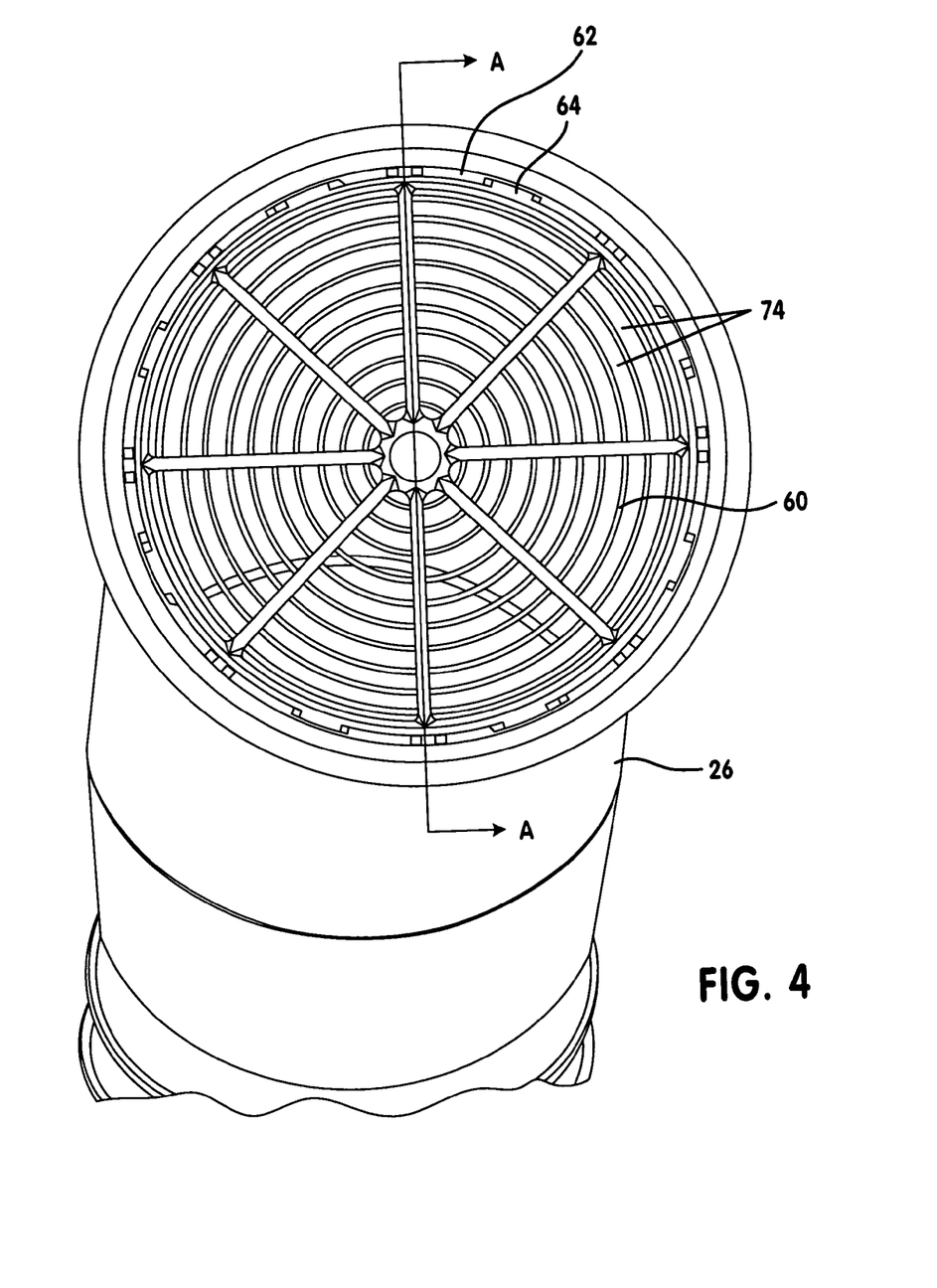
FIG. 4 is an end view of the clean air duct.

With reference to FIGS. 2 through 4, the exemplary clean air duct 26 illustrated is an assembly that includes a duct structure 40 and a hydrocarbon trap assembly 42. The duct structure 40 may be any type of metal, rubber or plastic tubing or hose and can be a molded/extruded rubber, for example. Also in the example provided, the duct structure 40 includes a coupling portion 46 having a stop member 48, which may be one or more protrusions located along the inside diameter of the duct structure 40, and a lock portion 50 that may include an outwardly tapering or flared section 52 and an abutting wall 54.

The hydrocarbon trap assembly 42 may include an element 60, a support 62 and a lid 64. The element 60 may be formed of a sheet paper material that is capable of adsorbing and desorbing gaseous hydrocarbons. In the particular example provided, the sheet paper material is an activated carbon sheet, such as an ACS-270 product that is commercially available from MeadWestvaco. In the particular example provided, the sheet paper material has a sheet density of about 270 pounds per 3000 square feet (±10%) and a minimum working butane capacity of about 5 grams/square foot, but a sheet paper material with a different density, such as 135 pounds per 3000 square feet, and/or a different minimum working butane capacity, such as about 2 grams/square foot, could be used.

Figure 5:
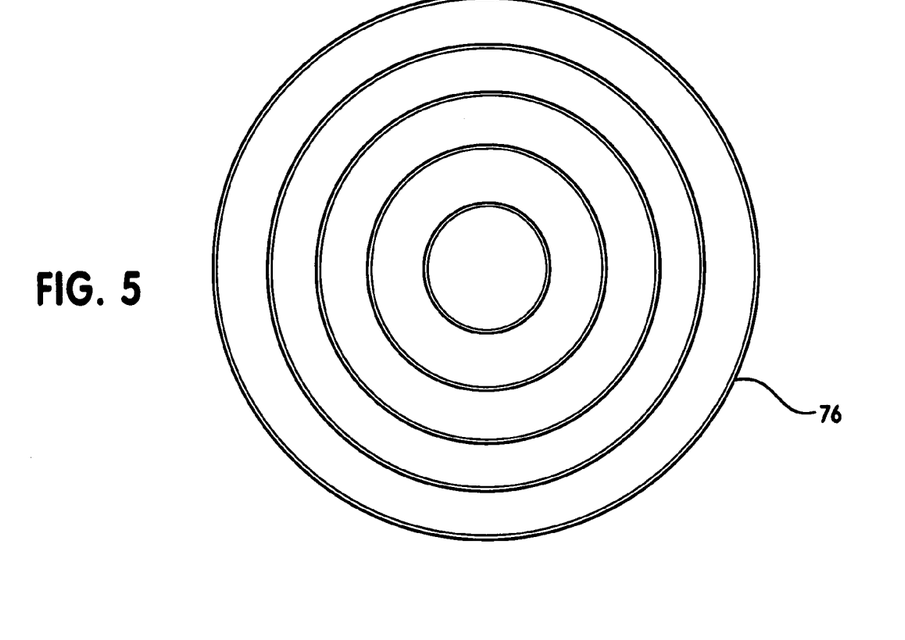
FIGS. 5 and 6 are end views of alternately constructed filter elements.
Figure 6:
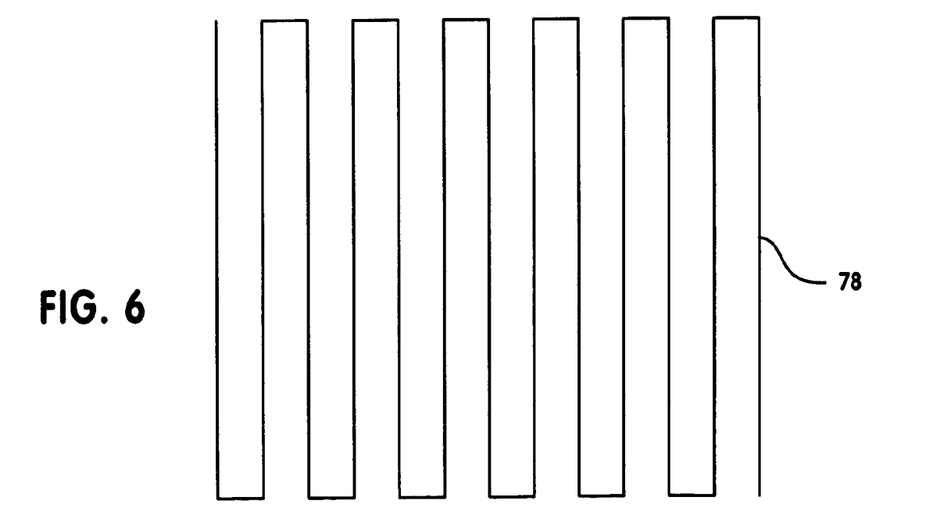

The support 62, which can be optional, may include a plurality of fingers or teeth 70 through which the element 60 is woven to thereby form a plurality of flow channels 74 that may be bounded on two sides by the hydrocarbon adsorbing material from which the element 60 is formed. In the particular example provided, the element 60 is woven or wound through the teeth 70 in a substantially spiral manner. Those of ordinary skill in the art will appreciate from this disclosure, however, that other patterns or forms of weaving or winding may also be employed, such as concentric shapes (e.g., circles 76) as shown in FIG. 5 or an alternating tooth-like pattern 78 of the type that is shown in FIG. 6, for example. Additionally, the element 60 need not be formed from a single section of the sheet paper material, but may be formed in the alternative from a plurality of discrete segments of the material. It can be appreciated that although the comb members 90 are illustrated and described herein as being associated with the support 62, those of ordinary skill in the art can appreciate that in the alternative, the comb members 90 can be associated with another component, such as the lid 64.

Returning to FIGS. 2 through 4, the support 62 may include a plurality of comb members 90 each of which having a set 92 of the teeth 70. The comb members 90 may extend generally radially outwardly from a centerline of the support 62. In the particular example provided, the support 62 includes an outer body member 94, to which the comb members 90 are coupled, and an annular retention lip 96 that may extend partially or fully about the perimeter of the outer body member 94.

The lid 64 may be coupled to the support 62 via any appropriate means including adhesives, welds, snap fits and fasteners and may cooperate with the support 62 to retain the element 60 in a stationary condition relative to the support 62. In the example provided, the lid 64 includes a plurality of ribs or spokes 98 that extend outwardly and which are generally aligned to a respective one of the comb members 90 when the lid 64 and the support 62 are coupled to one another.

The lid 64 and the support 62 may include locking features that permit the lid 64 to be aligned and secured to the support 62 without use of discrete fasteners, adhesives or welds. In the particular example provided, the retention lip 96 includes a plurality of apertures 100 and the lid 64 includes a plurality of locking tabs 102. Insertion of the locking tabs 102 into respective apertures 100 aligns the lid 64 to the support 62, as well as couples the lid 64 and the support 62 to one another.

Assembly of the clean air duct 26 is accomplished by inserting and securing the hydrocarbon trap assembly 42 to the duct structure 40. In the particular example provided, the hydrocarbon trap assembly 42 is snap-fit into the coupling portion 46 of the duct structure 40. More particularly, the hydrocarbon trap assembly 42 is inserted into the coupling portion 46 such that the outer body member 94 of the support 62 is abutted against the stop member 48 and the retention lip 96 is received into the outwardly flared section 52 and abutted against the abutting wall 54.

When the powertrain 10 (FIG. 1) is not in operation, gaseous hydrocarbons emitted from the air intake manifold 30 (FIG. 1) travel reversely through the duct structure 40 of the clean air duct 26 and pass into the flow channels 74 in the element 60 so that a relatively large amount of the gaseous hydrocarbons may be adsorbed by the element 60. During the operation of the powertrain 10 (FIG. 1), clean air exiting the primary air filter 22 (FIG. 1) is directed through the duct structure 40 and passes through the element 60. The flow channels 74 permit a relatively large amount of air to pass through the element 60 without developing a significant back pressure that would impair the performance of the powertrain 10 (FIG. 1). Additionally, air passing through the element 60 permits the previously adsorbed hydrocarbons to be desorbed into the air stream where they are fed to the engine 12 (FIG. 1).

Figure 7:
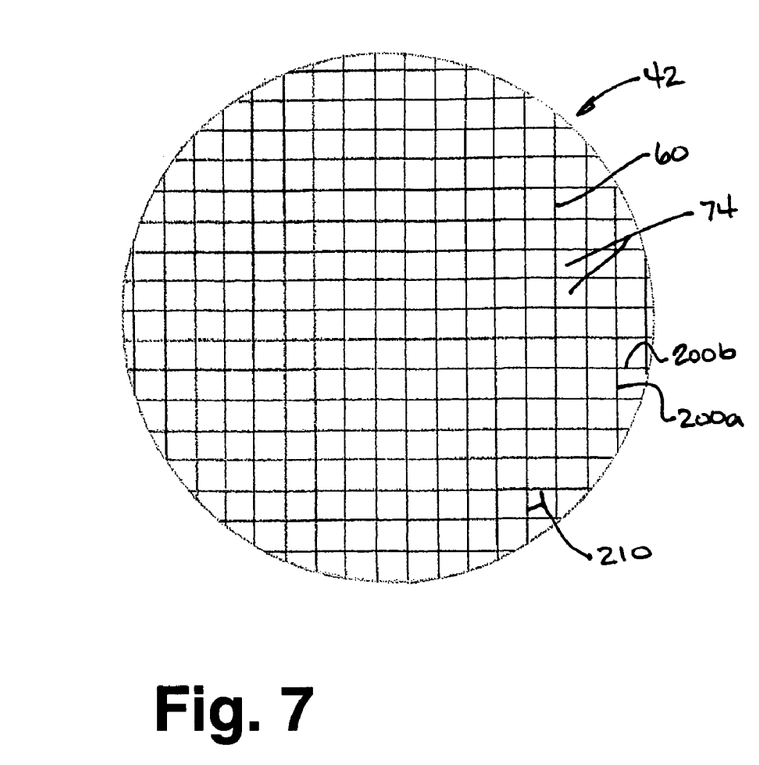
FIG. 7 is a plan view of another hydrocarbon trap assembly constructed in accordance with the teachings of the present invention.
Figure 8:
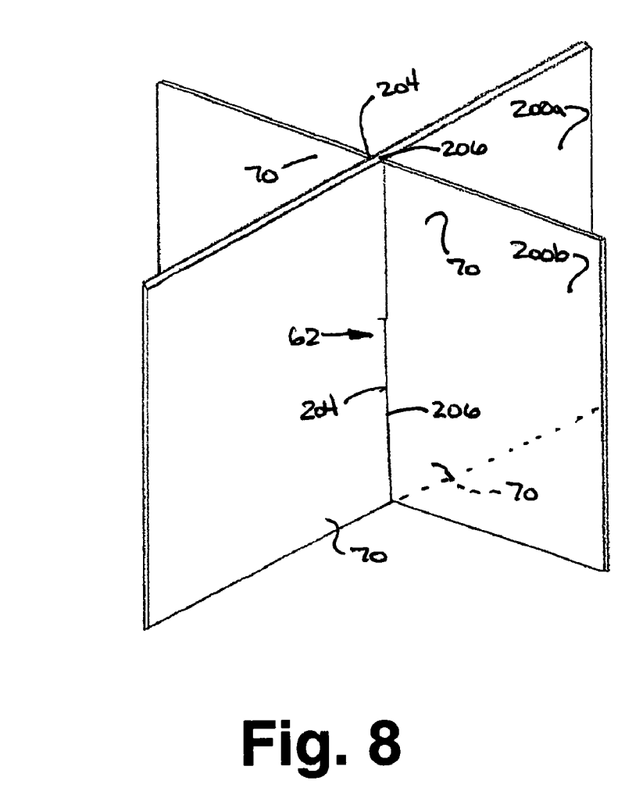
FIG. 8 is a perspective view of a portion of the hydrocarbon trap assembly of FIG. 7.
Figure 9:
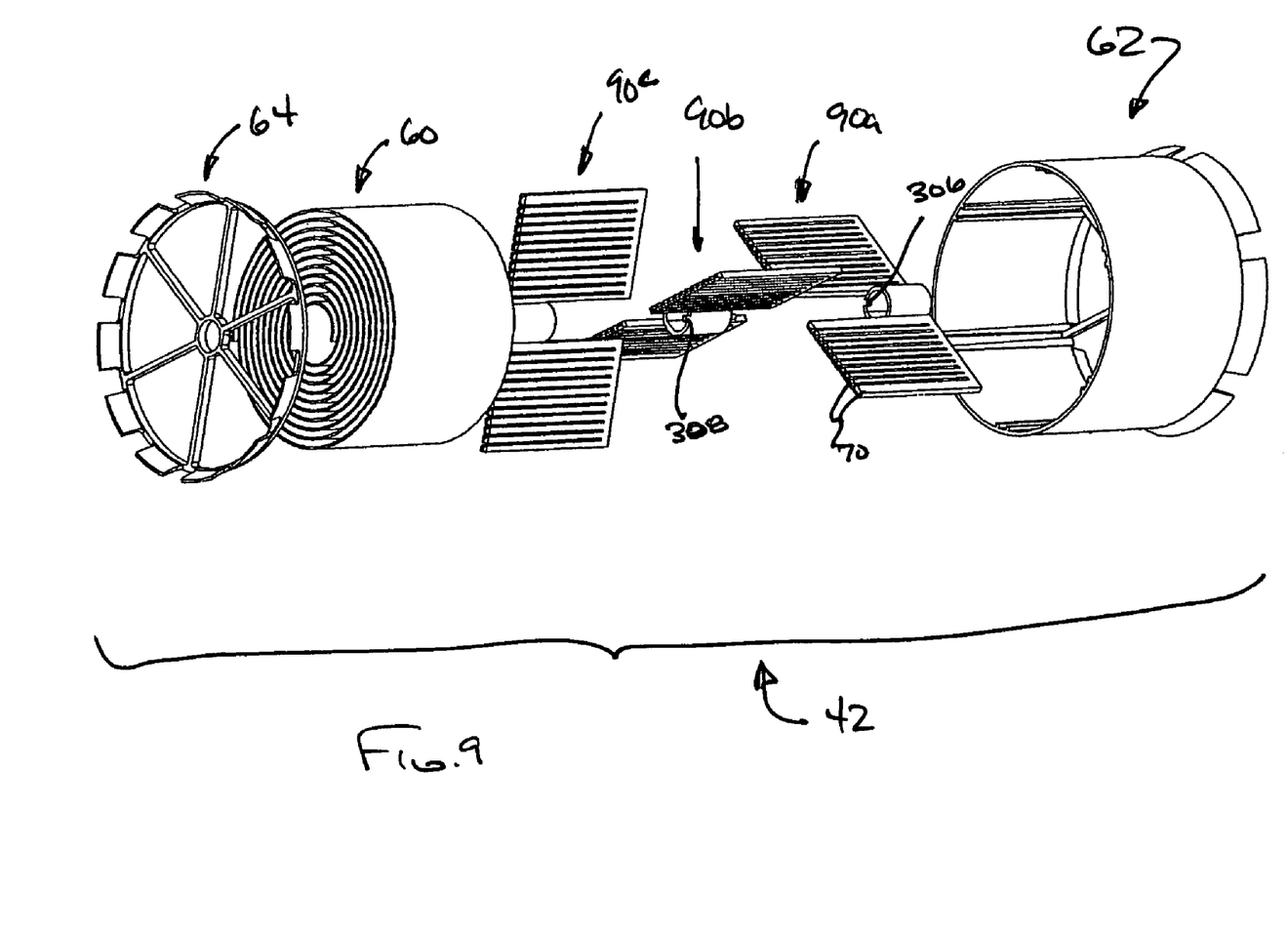
FIG. 9 is an exploded perspective view of another hydrocarbon trap assembly constructed in accordance with the teachings of the present invention.
Figure 10:
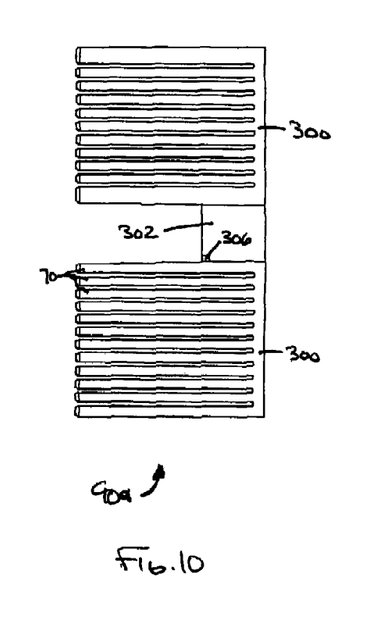
FIG. 10 is a side view of a portion of the hydrocarbon trap assembly of FIG. 9 illustrating a first one of the comb members in greater detail.
Figure 11:
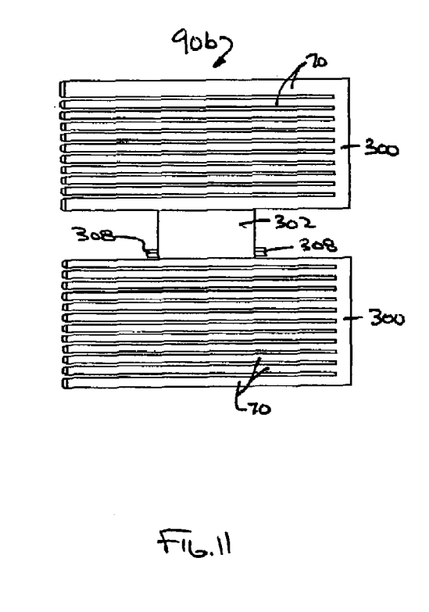
FIG. 11 is a side view of a portion of the hydrocarbon trap assembly of FIG. 9 illustrating a second one of the comb members in greater detail.
Figure 12:
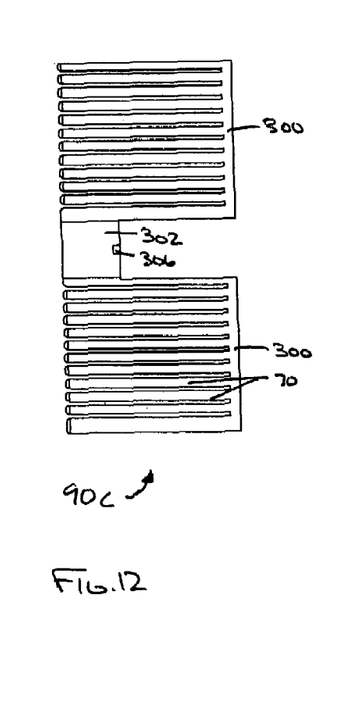
FIG. 12 is a side view of a portion of the hydrocarbon trap assembly of FIG. 9 illustrating a third one of the comb members in greater detail.

While the air induction system 10 has been illustrated and described above as including a hydrocarbon trap assembly 42 with a support 62 for supporting the element 60, those of ordinary skill in the art will appreciate that in its broadest aspects, the invention may be constructed somewhat differently. For example, the hydrocarbon trap assembly 42 may be constructed as illustrated in FIGS. 7 and 8. In this example, the hydrocarbon trap assembly 42 includes an element 60, which is formed of a sheet paper material that is capable of adsorbing gaseous hydrocarbons and which includes an integrally formed support 62. In the particular example provided, the sheet paper material is an activated carbon sheet, such as an ACS-270 product that is commercially available from MeadWestvaco, and can have a sheet density of about 270 pounds per 3000 square feet (±10%) and a minimum working butane capacity of about 5 grams/square foot. Those of ordinary skill in the art will appreciate from this disclosure, however, that a sheet paper material with a different density, such as 135 pounds per 3000 square feet, and/or a different minimum working butane capacity, such as about 2 grams/square foot, could be used.

In contrast to the element 60 that is illustrated in FIGS. 2 through 4, the element 60 of FIGS. 7 and 8 is configured to be self-supporting. One way in which the element 60 can be made to be self-supporting is through the use of two or more pieces of the sheet material (e.g., 200a and 200b) and the use of slotted apertures 204 that can be formed partially through the pieces of sheet material. The slotted apertures 204 can be sized and shaped such that when the slotted apertures 204 in a first one of the pieces of sheet material (e.g., 200a) are vertically aligned to the slotted apertures 204 in a second one of the pieces of sheet material (e.g. 200b), the pieces of sheet material may be translated toward one another such that an unslotted portion (206) of each piece of sheet material (200a and 200b) may be disposed within an associated one of the slotted apertures 204. It will be appreciated that the portion of each piece of sheet material effectively forms a finger 70 for supporting the other piece of sheet material. Accordingly, it will be appreciated that the interlacing of the pieces of sheet material between the fingers of opposite pieces of sheet material effectively forms a support 62 that is integral to the element 60.

Although the pieces of sheet material are illustrated as defining generally transverse wall segments 210 (so that the majority of the flow channels 74 are generally square in shape), those of ordinary skill in the art will appreciate that the wall segments 210 may have any desired configuration. Accordingly the majority of the flow channels 74 may be consistently formed with a different shape (e.g., any triangular or parallelogram shape) or with one or more shapes.

Yet another hydrocarbon trap assembly 42 constructed in accordance with the teachings of the present invention is illustrated in FIGS. 9 through 13. In this example, the hydrocarbon trap assembly 42 can include a support 62 and a plurality of interlocking comb members 90a, 90b and 90c.

Each of the comb members 90*a*, 90*b* and 90*c* can include a pair of comb portions 300 that can be disposed on opposite sides of a hub portion 302. The fingers 70 of each comb portion 300 may be fixedly coupled at a first end to a support or structural portion and may be tapered on an opposite end to facilitate assembly of the element therebetween. Each hub portion 302 may include a locking or orientation feature that permits the hub portion 302 of one comb member (e.g., 90*a*) to be fixedly coupled to the hub portion 302 of an adjacent comb member (e.g., 90*b*). In the example provided, the hub portion 302 of comb members 90*a* and 90*c* include a tab recess 306 that is configured to receive a corresponding tab 308 that is formed on the hub portion 302 of the comb member 90*b*. Those of ordinary skill in the art will appreciate that various other shapes and configurations may be employed to orient or lock the comb members to one another. Those of ordinary skill in the art will also appreciate that although the hub portion 302 is illustrated herein as being generally tubular in shape, other shapes and configurations may be readily substituted therefor.

Figure 13:
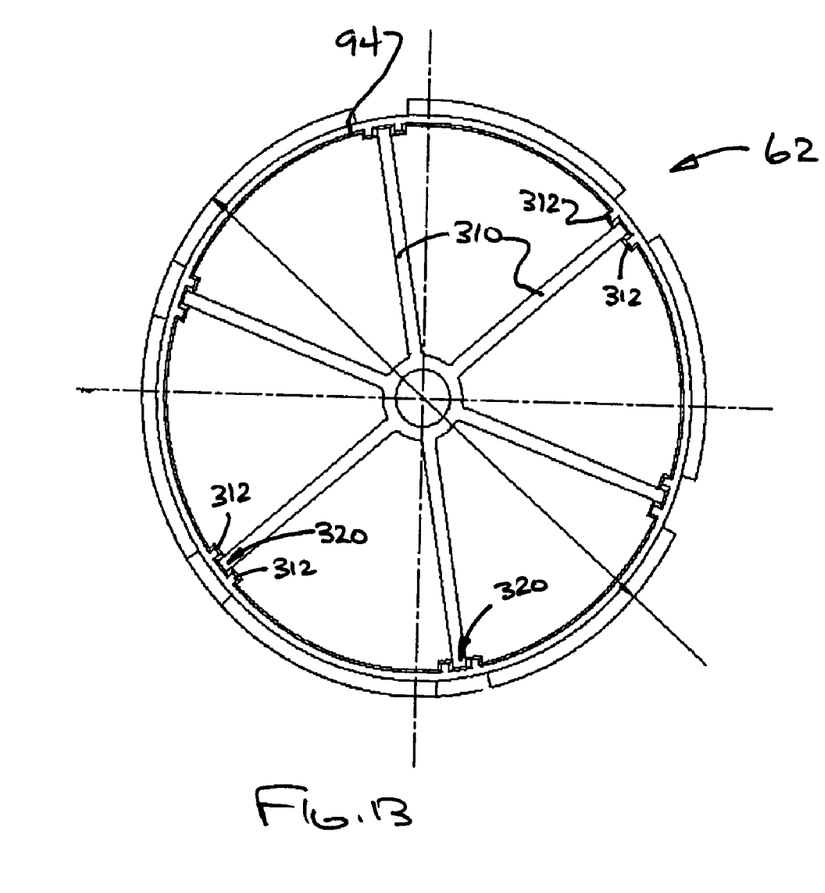
FIG. 13 is a front view of a portion of the hydrocarbon trap assembly of FIG. 10 illustrating the outer body member of the support.

The outer body member 94 of the support 62 can be configured with a plurality of spokes 310 and ribs 312 that are complementary to the comb portions 300 of the comb members 90*a*, 90*b* and 90*c*. In this regard, grooves 320 may be formed into the ribs 312 (and optionally the spokes 310) to receive the comb portions 300.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A combination comprising:
a sheet paper element that is at least partially formed of a material capable of adsorbing and desorbing gaseous hydrocarbons, the paper element having a plurality of adjacent sheet members; and
a plurality of fingers disposed between and supporting adjacent pairs of the sheet members so that each adjacent pair of the sheet members forms a flow channel.

2. The combination of claim 1, wherein the paper element is spirally wound through the fingers.

3. The combination of claim 1, further comprising a lid and a carrier housing, the lid being coupled to the carrier housing and abutting the paper element.

4. The combination of claim 3, wherein the fingers are fixedly coupled to a carrier housing, the lid or to both the carrier housing and the lid.

5. The combination of claim 4, wherein the lid includes a plurality of ribs, each of the ribs being generally aligned to a set of the fingers.

6. The combination of claim 5, wherein the carrier housing and the lid include mating locking features that align and couple the carrier housing and the lid to one another.

7. The combination of claim 6, wherein the mating locking features include a plurality of tabs coupled to one of the carrier housing and the lid and a plurality of apertures formed in the other one of the carrier housing and the lid, wherein each of the apertures is configured to receive an associated one of the tabs therein.

8. The combination of claim 1, wherein the paper element is an activated charcoal paper.

9. The combination of claim 8, wherein the activated charcoal paper has a minimum butane working capacity of about 5 grams/square foot.

10. The combination of claim 1, wherein the fingers are carried by another piece of the material that is capable of adsorbing and desorbing gaseous hydrocarbons.

11. The combination of claim 10, wherein slotted apertures are formed in the another piece of the material, the slotted apertures being sized to receive an associated one of the adjacent sheet members therein.

12. The combination of claim 1, wherein the fingers are formed onto comb portions that are associated with a plurality of comb members, each of the comb members including a hub portion that is disposed between two respective comb portions.

13. The combination of claim 12, wherein the hub portion of a first one of the comb members engages a second one of the comb members.

14. The combination of claim 13, wherein the hub portions of the first and second ones of the comb members include mating tabs and recesses.

15. The combination of claim 12, further comprising a carrier housing, the carrier housing including a plurality of spokes that support the comb portions of the comb members.

16. The combination of claim 15, wherein the spokes include grooves for receiving the comb portions.

17. A combination comprising:
a housing; and
an air cleaner assembly coupled to the housing, the air cleaner assembly including a support and a hydrocarbon adsorbent paper, the support including a plurality of comb members, each comb member having a plurality of teeth, the hydrocarbon adsorbent paper being woven through the teeth of the comb members so as to define a plurality of supported flow channels.

18. The combination of claim 17, wherein each comb member extends in an outward direction relative to a centerline of the support.

19. The combination of claim 18, wherein the hydrocarbon adsorbent paper is spirally wound through the comb members.

20. The combination of claim 17, wherein the support is fixedly coupled to the housing.

21. The combination of claim 20, wherein the housing includes a coupling portion with a stop member and an abutting wall and the hydrocarbon trap assembly is installed into the coupling portion and abutted against the stop member and the abutting wall.

22. The combination of claim 21, wherein the coupling portion further includes a tapered flange against which a retention lip formed on the hydrocarbon trap assembly is engaged.

23. The combination of claim 17, wherein the housing is a tube.

24. The combination of claim 17, wherein the air cleaner assembly further comprises a lid coupled to the support, the lid and the support cooperating to hold the hydrocarbon adsorbent paper.

25. The combination of claim 24, wherein the lid and the support include at least one mating snap-lock feature that cooperates to align and lock the lid and the support to one another.

26. The combination of claim 24, wherein the lid includes a plurality of ribs that are aligned to the comb members.

27. The combination of claim 17, wherein the comb members are formed of the hydrocarbon adsorbent paper.

28. The combination of claim 17 wherein the fingers are formed onto comb portions that are associated with the comb members, each of the comb members including a hub portion that is disposed between two respective comb portions.

29. The combination of claim 28, wherein the hub portion of a first one of the comb members engages a second one of the comb members.

30. The combination of claim of claim 29, wherein the hub portions of the first and second ones of the comb members include mating tabs and recesses.

31. The combination of claim 28, further comprising a carrier housing, the carrier housing including a plurality of spokes that support the comb portions of the comb members.

32. The combination of claim 31, wherein the spokes include grooves for receiving the comb portions.

33. A method comprising:
providing a housing;
installing a hydrocarbon adsorbent paper element in the housing such that the hydrocarbon adsorbent paper element at least partially defines a plurality of flow channels; and
adsorbing hydrocarbons into the hydrocarbon adsorbent paper element from air passing in a first direction through the flow channels;
wherein the step of installing the hydrocarbon adsorbent paper element includes weaving a hydrocarbon adsorbent paper through a plurality of teeth.

34. The method of claim 33, further comprising passing air in a second direction through the flow channels to desorb hydrocarbons from the hydrocarbon adsorbent paper element.

35. The method of claim 33, wherein the hydrocarbon adsorbent paper is woven through the plurality of teeth in a spiral manner.

36. The method of claim 33, wherein the hydrocarbon adsorbent paper is formed of one continuous sheet member.

37. The method of claim 33, wherein the teeth are at least partially formed by a second piece of the hydrocarbon adsorbent paper.

38. A vehicle powertrain comprising:
an internal combustion engine having an intake manifold:
an air filter housing coupled to the internal combustion engine; and
a duct assembly having a duct structure and a hydrocarbon trap assembly, the duct structure coupling the air filter housing and the intake manifold in fluid connection, the hydrocarbon trap assembly including a support and a filter element that is formed of an activated charcoal paper, the support being mounted in the duct structure and cooperating with the activated charcoal paper to form a plurality of flow channels;
wherein the support includes a plurality of teeth that support the activated charcoal paper at predetermined points.

39. The vehicle powertrain of claim 38, wherein the activated charcoal paper is spirally woven through the plurality of teeth.

40. The vehicle powertrain of claim 38, wherein the teeth are formed onto a plurality of discrete comb members.

41. The vehicle powertrain of claim 40, wherein each of the comb members includes a hub portion that is disposed between a respective portion of the teeth.

42. The vehicle powertrain of claim 41, wherein the hub portion of a first one of the comb members engages a second one of the comb members.

43. The vehicle powertrain of claim 42, wherein the hub portions of the first and second ones of the comb members include mating tabs and recesses.

44. The vehicle powertrain of claim 41, further comprising a carrier housing, the carrier housing including a plurality of spokes that support the comb portions of the comb members.

45. The vehicle powertrain of claim 44, wherein the spokes include grooves for receiving the comb portions.

46. The vehicle powertrain of claim 38, wherein the duct structure includes a coupling portion with a stop member and an abutting wall and the hydrocarbon trap assembly is installed into the coupling portion and abutted against the stop member and the abutting wall.

47. The vehicle powertrain of claim 38, wherein the hydrocarbon trap assembly further comprises a lid coupled to the support, the lid and the support cooperating to hold the activated charcoal paper.

48. A vehicle powertrain comprising:
an internal combustion engine having an intake manifold;
an air filter housing coupled to the internal combustion engine; and
a duct assembly having a duct structure and a hydrocarbon trap assembly, the duct structure coupling the air filter housing and the intake manifold in fluid connection, the hydrocarbon trap assembly including a support and a filter element that is formed of an activated charcoal paper, the support being mounted in the duct structure and cooperating with the activated charcoal paper to form a plurality of flow channels;
wherein the duct structure includes a coupling portion including a tapered flange against which a retention lip formed on the hydrocarbon trap assembly is engaged.

49. The vehicle powertrain of claim 48, wherein the hydrocarbon trap assembly further comprises a lid coupled to the support, the lid and the support cooperating to hold the activated charcoal paper.

50. A vehicle powertrain comprising:
an internal combustion engine having an intake manifold:
an air filter housing coupled to the internal combustion engine; and
a duct assembly having a duct structure and a hydrocarbon trap assembly, the duct structure coupling the air filter housing and the intake manifold in fluid connection, the hydrocarbon trap assembly including a support and a filter element that is formed of an activated charcoal paper, the support being mounted in the duct structure and cooperating with the activated charcoal paper to form a plurality of flow channels;
wherein the hydrocarbon trap assembly includes a lid coupled to the support, the lid and the support cooperating to hold the activated charcoal paper.

51. The vehicle powertrain of claim 50, wherein the lid and the support include at least one mating snap-lock feature that cooperates to align and lock the lid and the support to one another.

52. The vehicle powertrain of claim 50, wherein the lid includes a plurality of ribs, each of the ribs being generally aligned to a portion of the teeth.

* * * * *